United States Patent [19]

Maeshima

[11] Patent Number: 4,562,485
[45] Date of Patent: Dec. 31, 1985

[54] COPYING APPARATUS

[75] Inventor: Katsuyoshi Maeshima, Tokyo, Japan

[73] Assignee: Canon Kabushiki Kaisha, Tokyo, Japan

[21] Appl. No.: 175,449

[22] Filed: Aug. 5, 1980

[30] Foreign Application Priority Data

Aug. 10, 1979 [JP] Japan ................. 54-102479
Aug. 10, 1979 [JP] Japan ................. 54-102480

[51] Int. Cl.$^4$ ............................................. H04N 1/40
[52] U.S. Cl. ................................. 358/280; 358/294; 358/296; 382/41
[58] Field of Search ............... 358/903, 237, 300, 290, 358/302, 256, 293, 294, 296; 364/523, 515; 355/14 C, 5, 7; 382/9, 46, 41, 45, 44

[56] References Cited

U.S. PATENT DOCUMENTS

| | | | |
|---|---|---|---|
| 3,710,323 | 1/1973 | Andrew et al. | 382/45 |
| 3,976,982 | 8/1976 | Eiselen | 382/44 |
| 4,196,450 | 4/1980 | Miller et al. | 358/903 |
| 4,271,476 | 6/1981 | Lotspiech | 382/46 |
| 4,302,782 | 11/1981 | Gunning et al. | 358/300 |
| 4,303,948 | 12/1981 | Arai et al. | 358/903 |

Primary Examiner—John C. Martin
Assistant Examiner—Edward L. Coles
Attorney, Agent, or Firm—Fitzpatrick, Cella, Harper & Scinto

[57] ABSTRACT

A copying apparatus includes a carriage on which an original document may be placed, a scanner for scanning the image of an original document placed on the carriage, a memory for storing the original image scanned by the scanner in a state of a group of pixels, a copy mode input device for determining the type of conversion to be used to form a copy image on a copy material in a relationship either faithful to or different from the image of the original document, a first control for controlling the pixel data readout from the memory in response to the input signal from the mode input device for effecting image conversion, a second control for controlling the readout function of the first control in case the image converted by the first control means overflows from the appropriate copying area for producing the image in predetermined position on the copy material, and an image forming device for forming the image on the predetermined position of the copy material in response to the readout data thus controlled by the second control.

44 Claims, 21 Drawing Figures

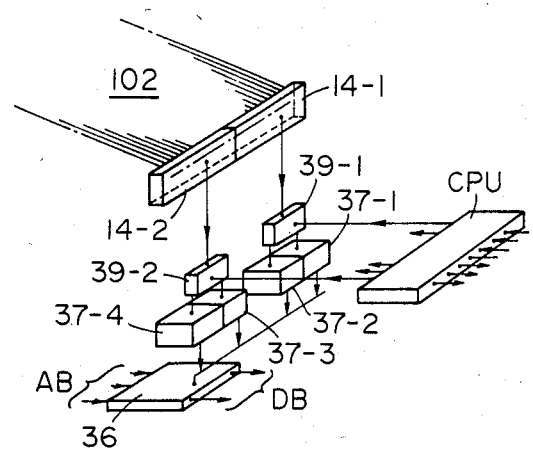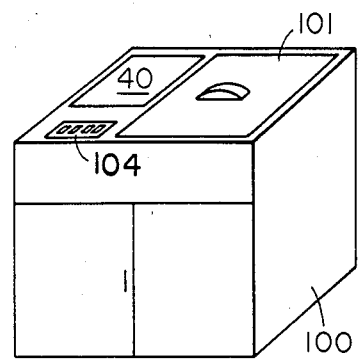
FIG. 1-3     FIG. 1-4
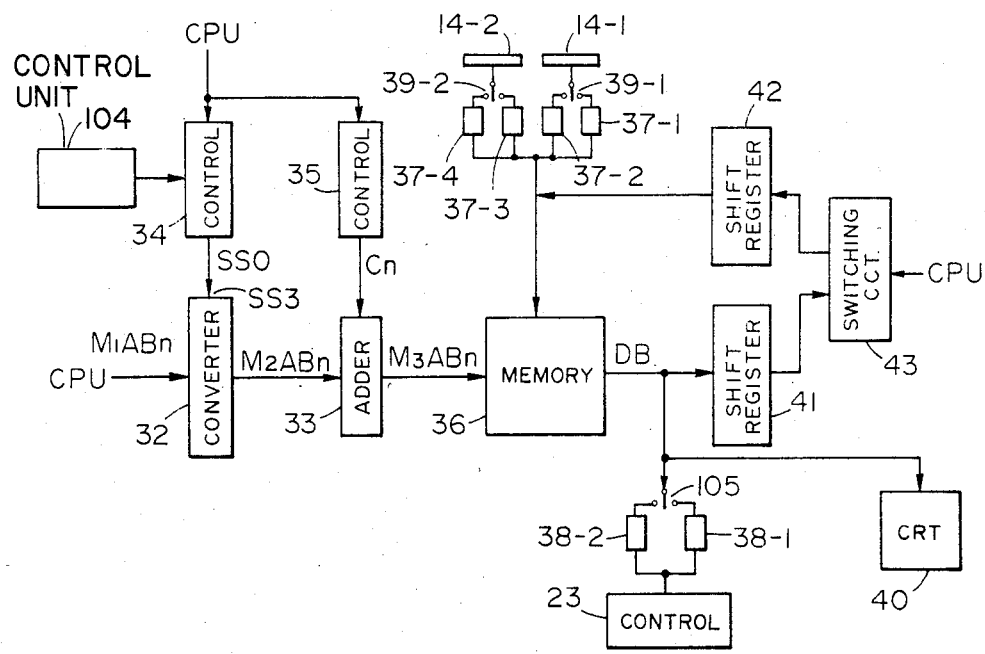
FIG. 2

COPYING APPARATUS

BACKGROUND OF THE INVENTION

1. Field of the Invention

The present invention relates to image conversion and/or image positioning.

2. Description of the Prior Art

In case of forming a copy image of an original document on a copy sheet, it has been generally necessary to place the original document on a determined position of a carriage in order to form said image on a determined position on the copy sheet. Since the original document and the copy sheet are both generally of rectangular form and the document image is formed longitudinally or transversally on said document, the copy images appear longitudinally or transversally on the time of rectangular copy sheet if the original documents are always placed in a determined direction at the copying. For this reason the copy images may appear in different directions if the copy sheets are not all sorted in the same direction. This drawback can be avoided by changing, at the formation of copy image, the direction and/or the position of the copy image with respect to the copy sheet. For example it is conceivable to optically process the exposed image of the original document to convert it into a desired form.

However the rotation, inversion or displacement of the copy image in optical method will require a complex combination of the displacements of mirrors and lenses employed in the original scanning, inevitably leading to a bulky complicated apparatus with a low reliability.

Also the conversion of the copy image by means of changing the direction or position of the copy sheet, though theoretically possible, will have similar associated difficulties.

Also, when the original image is to be partially concealed or deleted, there has generally been required a cumbersome operation of covering, during copying operation, such portion to be concealed or deleted with an opaque member.

SUMMARY OF THE INVENTION

The object of the present invention is to provide a copying apparatus not having the aforementioned drawbacks but capable of arbitrarily converting the copy image obtained from the original document placed on the carriage without utilizing a complicated mechanism.

Another object of the present invention is to provide a copying apparatus capable of image reproduction at a determined positioned of the copy sheet regardless of the direction or position of the original image by means of rotation, inversion or displacement of said image.

Still another object of the present invention is to provide a copying apparatus capable of a correction function in case the image after conversion exceeds the area for reproduction.

Still another object of the present invention is to provide a copying apparatus provided with a cathode ray display tube or the like to enable monitoring of the original and converted images and arbitrarily adjusting the conversion prior to the copying of the converted image.

Still another object of the present invention is to provide a copying apparatus in which the image displacement in vertical or lateral directions or image inversion during copying can be manually or automatically effected by means of preset mode keys.

Still another object of the present invention is to provide a copying apparatus capable of placing the copy image at the center of the copy sheet in case the original image is not centered.

Still another object of the present invention is to provide a copying apparatus useful in the design work with the image conversion by for example mirror inversion particularly when the original image is graphics.

Still another object of the present invention is to provide a copying apparatus capable of removing a secret or unnecessary portion of the original image by means of a simple procedure.

The foregoing and still other objects of the present invention will be clarified through the following description of the preferred embodiments of the present invention.

BRIEF DESCRIPTION OF THE DRAWINGS

FIG. 1-2 is a plan view of the control unit of the copier shown in FIG. 1-1;

FIG. 1-3 is a partial perspective view of the copier shown in FIG. 1-1;

FIG. 1-4 is a schematic perspective view of the copier shown in FIG. 1-1;

FIG. 2 is a block diagram for image conversion employed in the copier shown in FIG. 1-1;

FIGS. 3-1 A–B, 3-2, 7 and 8 are circuit diagrams of various units shown in FIG. 2;

FIGS. 4 and 5 are explanatory views showing various image conversions;

DESCRIPTION OF THE PREFERRED EMBODIMENTS

Figure 1:
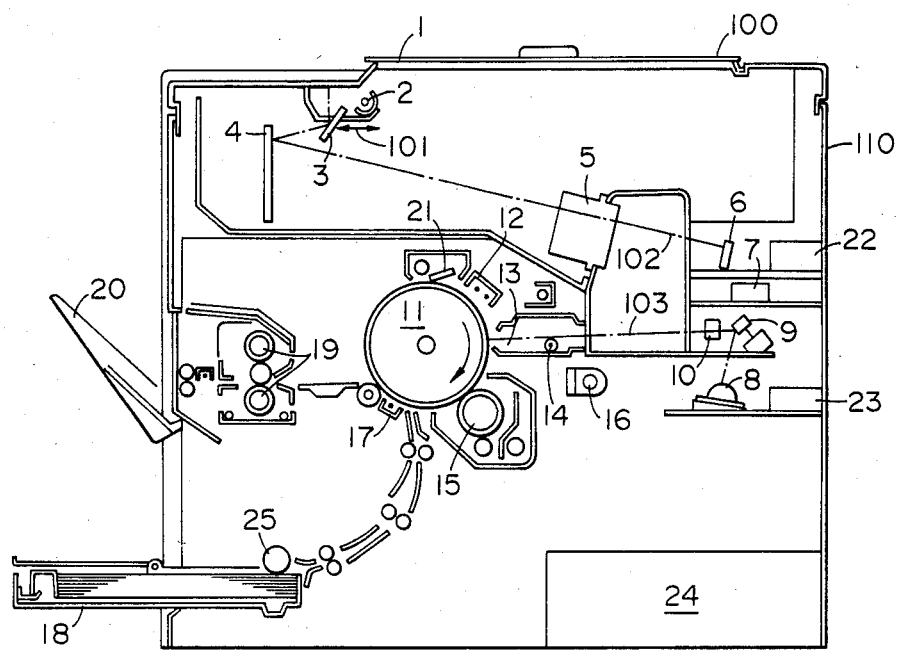
FIG. 1-1 is a cross sectional view of a copier in which the present invention is applicable.
Figures 1, 2:
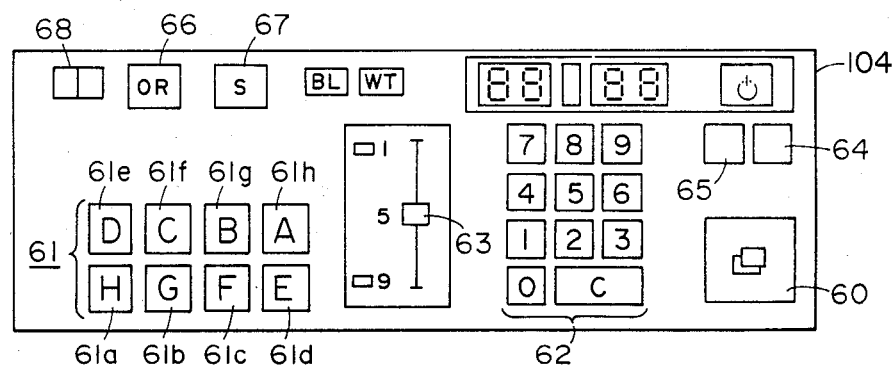
Figures 1, 3:
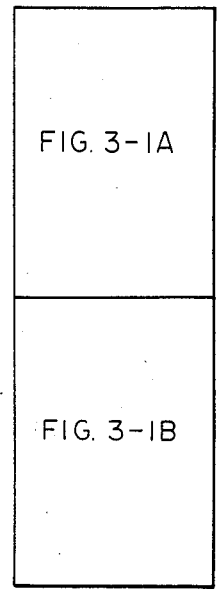
Figures 2, 3:
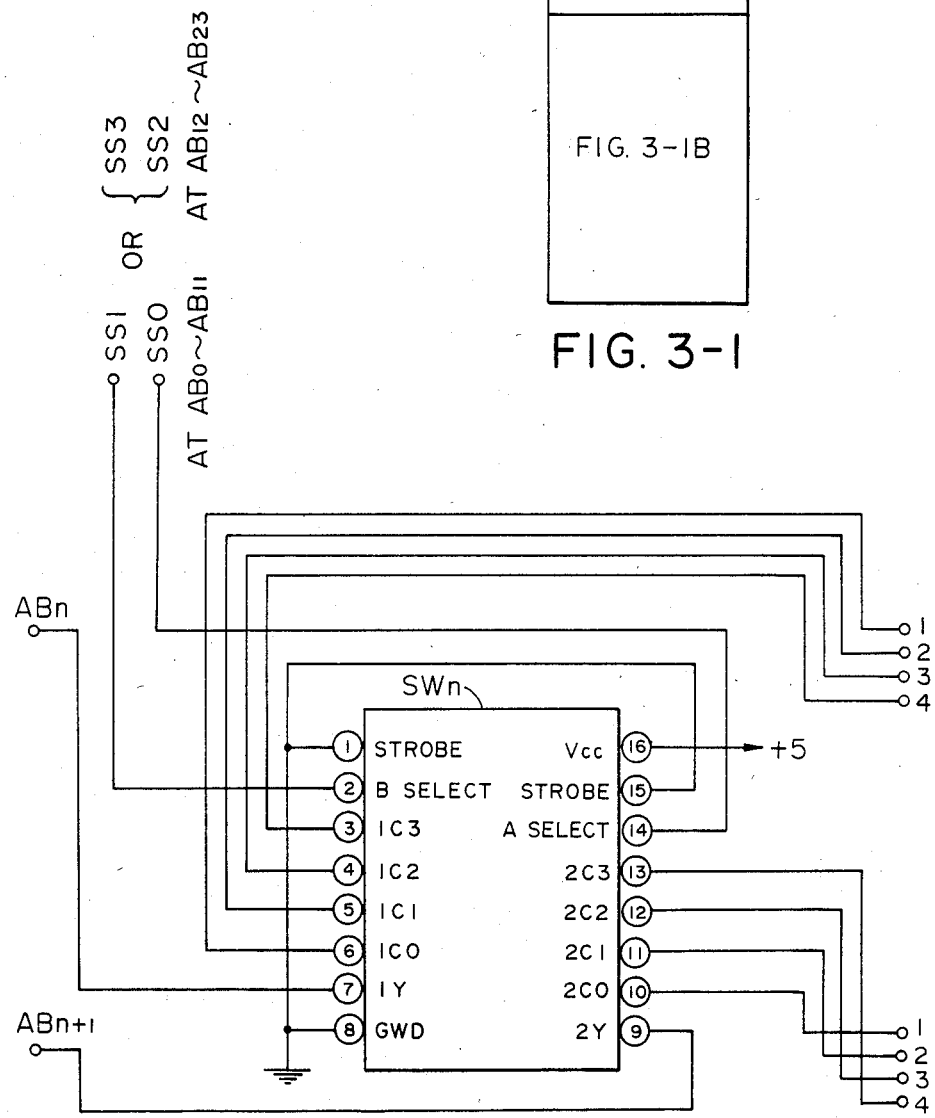

FIG. 1-1 is a schematic cross sectional view of a copier embodying the present invention, of which the control panel and the optical image reading portion are respectively shown in a plan view in FIG. 1-2 and in a perspective view in FIG. 1-3.

In FIG. 1-1 there are shown a carriage 1 for supporting the original; an original illuminating lamp 2 to be displaced with mirrors 3, 4 in the direction of arrow 101 for effecting the slit exposure of the original; a lens system 5 for focusing the light reflected from the original onto an image sensor 6 composed of a charge-coupled device; a control unit 7 for processing the image signals from said sensor 6; a laser beam source 8 combined with a drive unit 23 therefor; a polygonal mirror 9 for deflecting the beam from said laser beam source; an $f-\theta$ lens 10 for conducting peripheral correction on the deflected beam; a photosensitive drum 11; a corona charger 12 for positively charging the drum surface; a corona charger 13 for conducting charge elimination of the drum surface according to the image pattern; a lamp 14 for conducting variable negative charge elimination when the drum surface is not subjected to image exposure; a developing station 15 for developing the electrostatic latent image; a uniform exposure lamp 16 for forming the electrostatic latent image; a corona charger 17 for transferring the developed image onto a copy sheet supplied from a cassette 18; rollers 19 for fixing the transferred image; a tray 20 for receiving the copy sheets after image fixing; a cleaning blade 21 for cleaning the drum surface after the image transfer; a first central processing unit (CPU) 22 for controlling the image reading unit and the drive unit 23; and a second central processing unit 24 for controlling copy process means such as drum motor, chargers, lamps etc.

Also in the control unit 104 of FIG. 1-2 there are shown a copy start key 60; numeral keys 62 for presetting the number of copies to be prepared from an original; a slide lever 63 for controlling the copy image density; a memory key 64 for storing the original image in the image memory; a monitor key 65 for image readout from the memory; selector keys 61a–61h for presetting the position, direction, inversion etc. of the copy image in the modes A to H to be explained later and each having a lamp therein to be lighted upon key actuation; a clear key 66 for cancelling the mode selected by the keys 61; and a select enable key 67 for enabling the mode selection by the mode selector keys 61.

In FIGS. 1-3, 14-1 and 14-2 are self-scanning image sensors arranged in the slit direction and composed of already known charge-coupled devices which are arranged in series for improving the resolving power for original reading. As the commercially available CCD of 2 kilobits is insufficient in the resolving power for reading the original of a width corresponding to the A3 size, there are employed serially two CCD's for obtaining a doubled resolving power of 4 kilobits. There are also shown buffer memories 37-1 to 37-4 for temporarily storing the image signals from CCD's; switching elements 39-1 and 39-2 for selecting said memories 37-1 to 37-4; and a semiconductor random access memory (RAM) 36 for storing the image data. The first control unit 22 is provided for controlling the address scanning of the image memory 36 as will be explained later and is provided with a CPU for controlling the read/write control for the image memory 36.

Now there will be explained the function of the copier while making reference to FIGS. 1-1 to 1-4. The drum 11, the surface of which comprises a three-layered photosensitive member utilizing a CdS photoconductive layer, is rotatably supported and is put into rotation in the direction of the arrow in response to the copy instruction released by the actuation of the copy key 60.

The original placed on the carriage glass plate 1 is illuminated by the illuminating lamp 2 mounted fixedly with the first scanning mirror 3, upon actuation of the memory key 64, and the light reflected therefrom is scanned by the first and second scanning mirrors 3, 4. Said mirrors are displaced at a speed ratio of 1:½ to effect the original scanning while maintaining a constant optical path length in front of the lens 5.

Thus the reflected light image is focused, through said lens 5, onto the photosensor portion of the image sensor 6 (optical path 102), converted into electric signals for each slit line by the self-scanning function of CCD's and stored in four buffer memories 37-1 to 37-4.

From said buffer memories the data of one slit line are serially supplied to the image memory 36 and stored therein from the initial address thereof.

The above-mentioned function is achieved by storing the image data from the CCD's 14-1, 14-2 into the buffer memories 37-1, 37-3 selected by the switch elements 39-1, 39-2. Successively said switch elements are switched over to select the buffer memories 37-2, 37-4 into which the data are stored. At the same time the buffer memories 37-1, 37-3 serially release in this order the data already stored therein. Then the switch elements are again changed over to effect data storage into the buffer memories 37-1, 37-3 and the memories 37-2, 37-4 serially release in this order the data stored therein to the memory 36.

Figure 6:
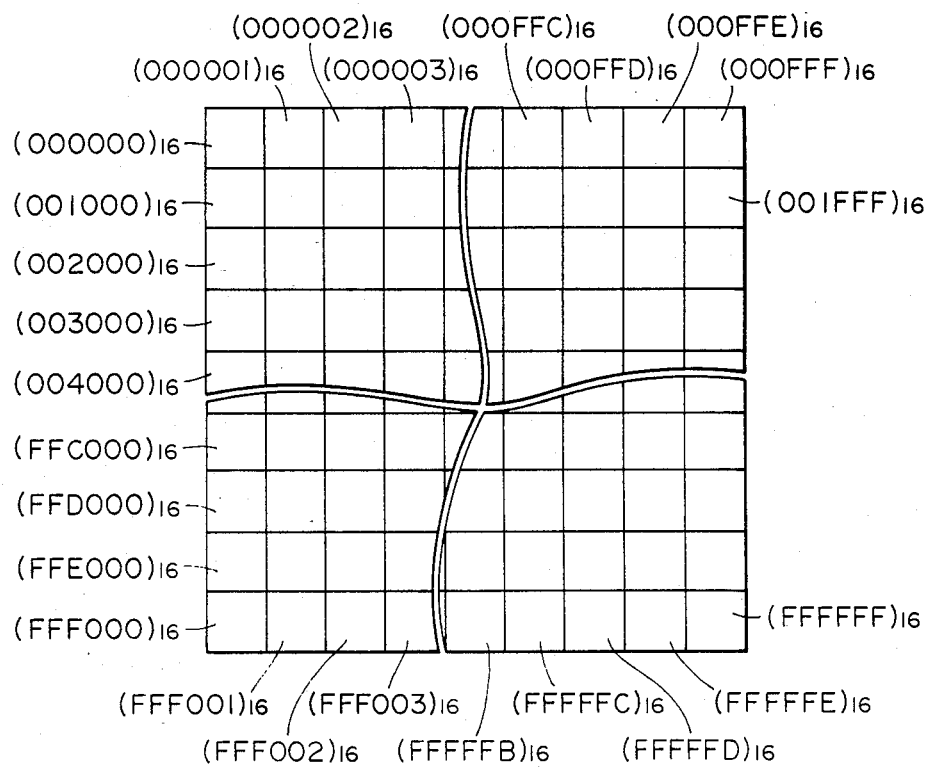
FIG. 6 is a map of the memory shown in FIG. 2.

As shown in FIG. 6, said memory 36 is divided into areas corresponding to the pixels and stores the serial data from said buffer memories, corresponding to the address scanning for the entire areas, in the order from left to right in the uppermost row, then from left to right in the next row and so forth. One scanning of said buffer memories 37-1, 37-3 and 37-2, 37-4 corresponds to the data of the aforementioned one slit line which are stored in one row of the random access memory 36.

The image data stored in the image memory 36 are serially released, in response to the actuation of the monitor key 65 or the copy 60, through a data bus line DB by the addressing and the address scanning over the entire area through an address bus line AB. The data thus released are supplied to a known cathode ray tube 40 (FIG. 1-4) to control the scanning and the brightness modulation thereof, thereby displaying an image identical with the original image placed on the carriage or stored in the memory 36. Said cathode ray tube is adapted to display the data of all the pixels stored in the memory 36 shown in FIG. 6 and is therefore provided with a square screen.

Figure 4:
Figure 5:
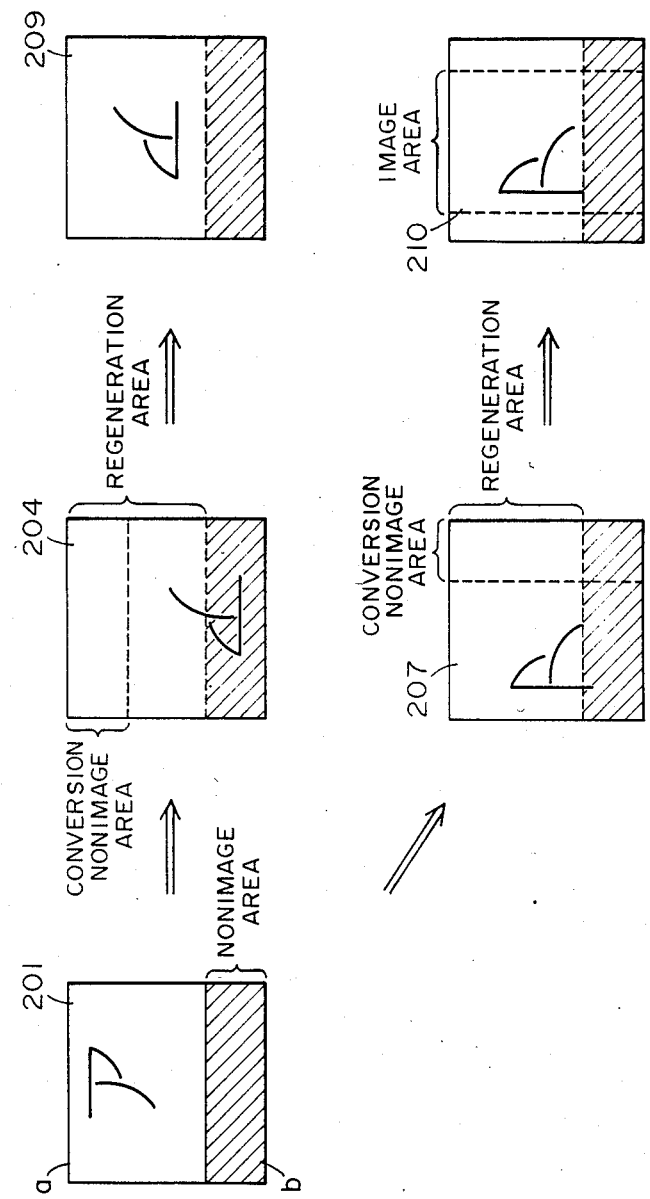

The above-mentioned signals supplied through the address bus line AB are subjected to conversion controls as shown in FIGS. 4 and 5, for example for reading the data from the memory 36 in the same order as they are stored to reproduce an image the same as the original of reading the data in the inverted order to reproduce an image rotated by 180°. Such conversion controls and the selection of the converting modes are achieved by the manual instructions from the mode keys 61 of the control unit 104 or by the internal instructions 61' of the CPU.

The cathode ray tube 40 is provided for facilitating such manual selection control, and displays an image the same as that of the original placed on the carriage thereby enabling the selection of the mode keys 61 or a converted image as shown in FIGS. 4 and 5 thereby enabling the correction of the selected mode. The mode keys 61 also perform the presetting of the apparatus and the mode latching for effecting the copying operation with the thus selected converted image.

In FIGS. 4 and 5, the state 201 indicates the image displayed on the cathode ray tube without any conversion in the position or direction or any inversion, wherein the areas a and b respectively correspond to the original image placed on the carriage and the blank area of the memory not containing the original data.

Upon actuation of the copy key 60 after the presetting of the conversion, the image data from the memory 36 are supplied through the switch element 105 and buffer memories 38-1, 38-2 (FIG. 2) to the laser drive unit 23. At first the image data are stored in the buffer 38-1 and then in the buffer 38-2 by means of said switch element 105, and at the same time initiated are the oscillation of the laser 8 and the deflection and modulation of the laser beam by means of the data stored in the buffer 38-1.

The laser beam is put into horizontal sweeping motion by means of the constant rotation of the polygonal mirror 9 and performs horizontal scanning on the photosensitive surface of the drum 11 through the f−θ lens 10, while said drum performs the scanning in the vertical direction by the constant rotation thereof. Said horizontal and vertical scanning motions are conducted at such speeds that the electrostatic latent image formed on said drum has the identical dimension as that of the original image placed on the carriage.

Simultaneously with the laser beam irradiation projected onto the drum, an AC charge elimination or a DC charge elimination of a polarity (for example negative) opposite to that of the primary charging is conducted by the charger 13, and subsequently a whole surface exposure is given by the uniform exposure lamp 16 to form an electrostatic latent image of an elevated contrast on the drum 11. Said latent image on the drum 11 is rendered visible as a toner image by the developing station 15. A copy sheet contained in the cassette 18 is advanced by the feed roller 25 into the apparatus, and supplied to the image transfer position by the register rollers with such timing that the leading end of said sheet coincides with the leading end of the latent image. After the toner image is transferred from the drum to the copy sheet by means of the transfer charger, the image is fixed to complete one copy, containing the data of all the pixels relating to the original stored in the image memory 36. In case plural copyings are instructed by the numeral keys 62, the data readout from the memory 36 is restarted upon completion of the beam scanning for one copy and repeated for desired plural times with the corresponding beam scannings to produce the latent images repeatedly in the above-explained manner, and plural copy sheets are correspondingly supplied in succession to obtain the copies of the desired number.

The cassette 18 contains a stack of plural copy sheets arranged in a direction which is so determined that the developed image is transferred onto a determined position of each sheet when the original is placed in the determined position on the carriage and is copied without image conversion. Stated differently said sheets are arranged to copy the area a on the cathode ray tube shown in the state 201 in FIG. 4.

In this manner the copying in a mode of high frequency of use can be effected with a simple operation.

On the other hand, in case the reproduced image selected by the mode keys 61 is in such a state as shown by 204 or 207, there may result a case where the reproduced image is only partially transferred to the copy sheet. According to the present invention, however, control is made on the data readout from the memory 36 in such a manner as to enable image reproduction on an appropriate position of the copy sheet even in such case.

In the following there will be given a detailed explanation on the control of image conversion and the selection of converting mode.

Figure 7:
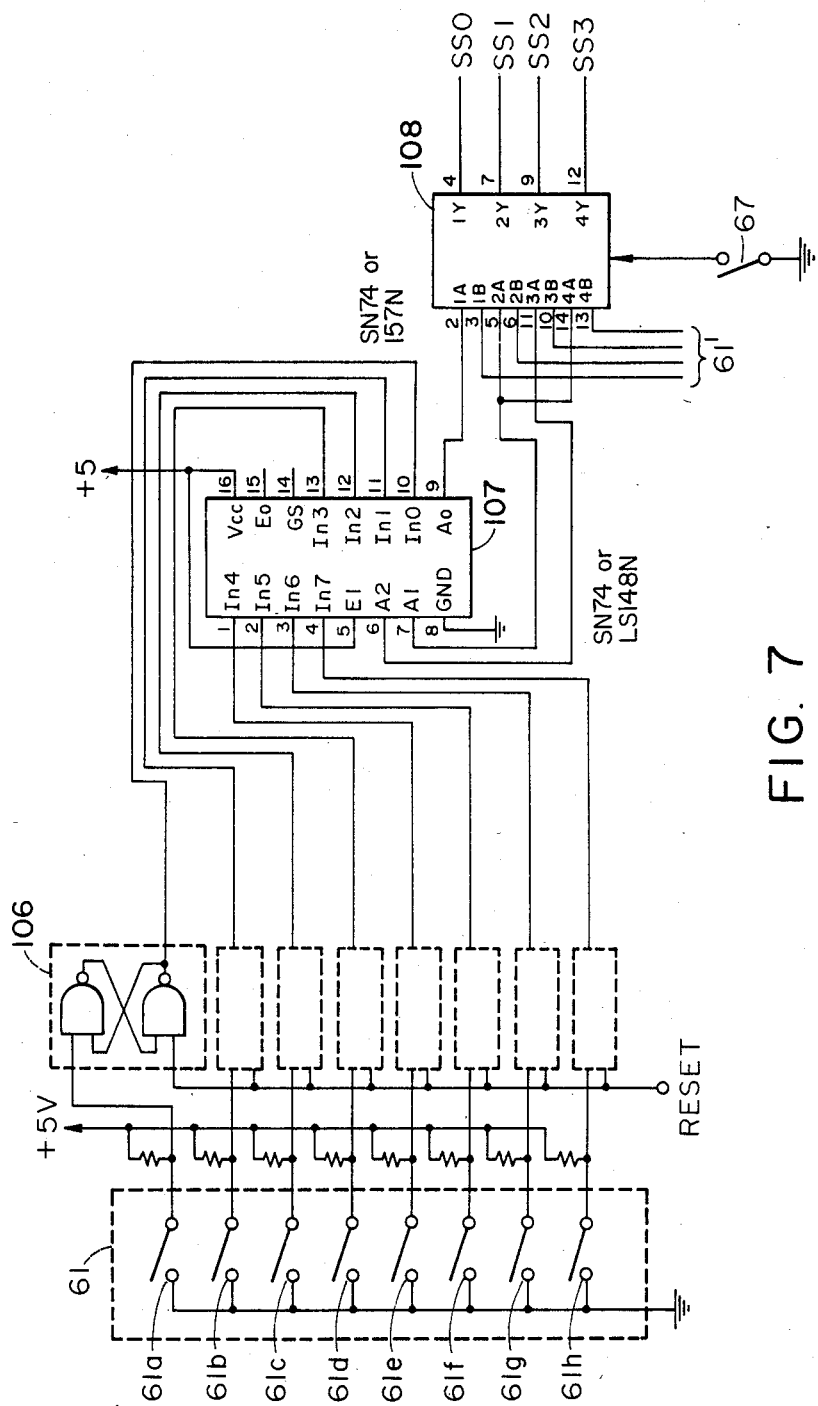
Figure 8:
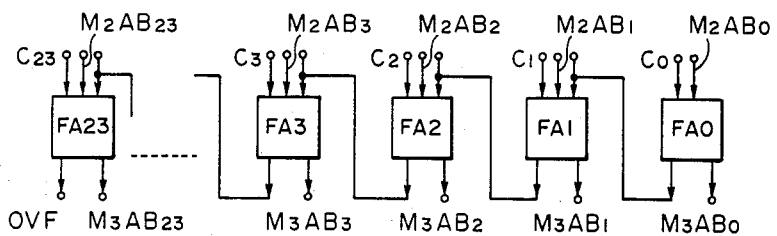

FIG. 2 shows the image conversion control circuit in a block diagram, in which there are shown a bus converting circuit 32 which controls the address bus line AB and is shown in detail in FIGS. 3-1 and 3-2; an adder circuit 33 for conducting additions to the address bus data and shown in detail in FIG. 8; a conversion control circuit 34 for controlling said bus converting circuit 32 and shown in detail in FIG. 7; an addition control circuit 35 for controlling the function of said adder circuit 33; buffer memories 37-1 to 37-4, 38-1 and 38-2 explained in the foregoing; a shift register 41 for converting the serial output of the data bus line DB from the memory 36 into parallel output to be supplied to the CPU; a shift register 42 for converting the parallel output from the CPU into serial data to be supplied to the memory 36 and also conducting the data storage from the CCD's 14-1, 14-2; and a switching circuit 43 for selecting the data transfer from the register 41 to the CPU or from the CPU to the register 42. The image memory 36 has the pixel areas as shown in FIG. 6.

The function of the circuit is as follows. Upon actuation of the memory key 64 after the original is placed on the carriage 1, the image data are stored in the image memory 36 in the aforementioned manner. Upon actuation of the monitor key 65, the data stored in said memory 36 are read through the bus line DB and displayed as a monitor image on the cathode ray tube 40. The data stored in the memory 36 are however retained until the actuation of the original clear key OR or the succeeding memory operation by the memory key 64.

The data readout from the memory 36 will be further explained in the following. In the above-explained circuit it is also possible to eliminate the monitor key 65, in which case the memory key 64 has the both functions of data storage and monitoring to automatically effect the image monitoring on the cathode ray tube after the data storage into the memory 36 is completed.

In response to the actuations of the normal mode key 61h and the monitor key 65, the image is reproduced in the same mode as in the original image. In this case the address scanning for data readout from the memory 36 is same as that for data storage therein as explained above.

Now reference is made to FIG. 6, showing the codes for specifying the memory areas. A code $(000000)_{16}$ indicates an area in the 1st row from the top and in the 1st column from the left: $(00000n)_{16}$ indicates an area in the n-th column from left in the same row: $(00n000)_{16}$ indicates an area in the n-th row from the top in the left end column: $(00100F)_{16}$ indicates an area in the 2nd row and in the 16th column: and $(001FFF)_{16}$ is an area in the 2nd row and in the $16 \times 16 \times 16$th column. In this manner each bite in this code is represented by six digits of 4-bit binary numbers. Consequently the entire areas can be represented by a code of 24 ($4 \times 6$) bits. For the purpose of data readout from the memory, the CPU step advances the lower three digits in the order from 000 to FFF, then adds one to the upper three digits to shift to the 2nd row and repeats the foregoing scanning cycle in the lower three digits from 000 to FFF, and this procedure is repeated thereafter to supply the pixel data of the entire areas in succession to the data bus line DB.

The data storage into the memory 36 is also effected by a similar scanning.

For the purpose of such scanning the CPU releases in succession a group of 24-bit address signals M1AB0–M1AB23 (FIG. 3-1). A pixel signal "1" corresponds to an image (dark) area, in response to which the laser beam is attenuated to form a dark potential on the drum to cause toner deposition.

The memory 36 is a semiconductor memory for example composed of the commercially available element 2147 supplied from Intel Corp. In case of storing an original image of A4 ($296 \times 210$ mm) size with a resolving power of ca. 14 pixels/mm, there will be required a memory capacity of ca. 12 Mbits. The above-mentioned memory element 2147, having a memory capacity of 16 Mbits ($4K \times 4K$), is enough for this purpose and further allows the data storage for a square area, corresponding to the screen of the cathode ray tube. In case an image of the A4 size is displayed on said screen, the blank area b can be utilized for displaying alarms, messages, comments etc. from the computer used as the CPU. The pixels correspond to the memory addresses in the foregoing manner, and there will be required a 24-bit address bus for the above-mentioned memory capacity of 16 Mbits.

It is naturally possible also to constitute the memory 36 with core memory or wire memory elements.

In response to the actuation of the monitor key 65 the aforementioned address data M1ABn are supplied from the CPU to the bus converting circuit 32 and converted therein into address bus signals by the control latch signals SS0–SS3 from the conversion control circuit 34. Said signals SS0–SS3 are supplied to said circuit 34 so as to enable the image conversion of a particular mode in response to the signal from the mode keys 61 or the mode signal 61' from the CPU as will be explained later. Said conversion control circuit 34 controls multiplexers SW0–SW23 in the converting circuit 32 according to said signals SS0–SS3 to suitably select the address bus line AB, whereby the address data M1ABn are supplied as the signals M2ABn through thus selected bus line to the adder circuit 32 and added therein with addition data Cn supplied from the addition control circuit 35.

Said adder circuit is provided for shifting, in case the image converted by said converting circuit 32 overflows the reproducible area, said image into said area, and the addition data Cn for this purpose are supplied from the CPU. In this manner the conversion of the reproduced image is achieved by the same function for the conversion of the image data stored in the memory.

FIG. 7 shows the image conversion control circuit 34, in which there are shown the aforementioned mode keys 61; flip-flops 106 for latching the data entered by said keys and to be reset by the clear key 66; an encoder 107 for example composed of the element SN74 or LS148N supplied by Texas Instruments, Inc. for converting the data latched in said flip-flops 100 into an octanary output signal A0–A1; and 61' is a particular mode select signal supplied in the copier from the CPU when the copier is set in a particular state for example in response to the copy sheet size or the magnification of the reproduced image. In the normal state for the A4 size and for a magnification of unity, this signal is equivalent to the normal mode signal to be supplied by the key 61h.

Figures 1A, 3:
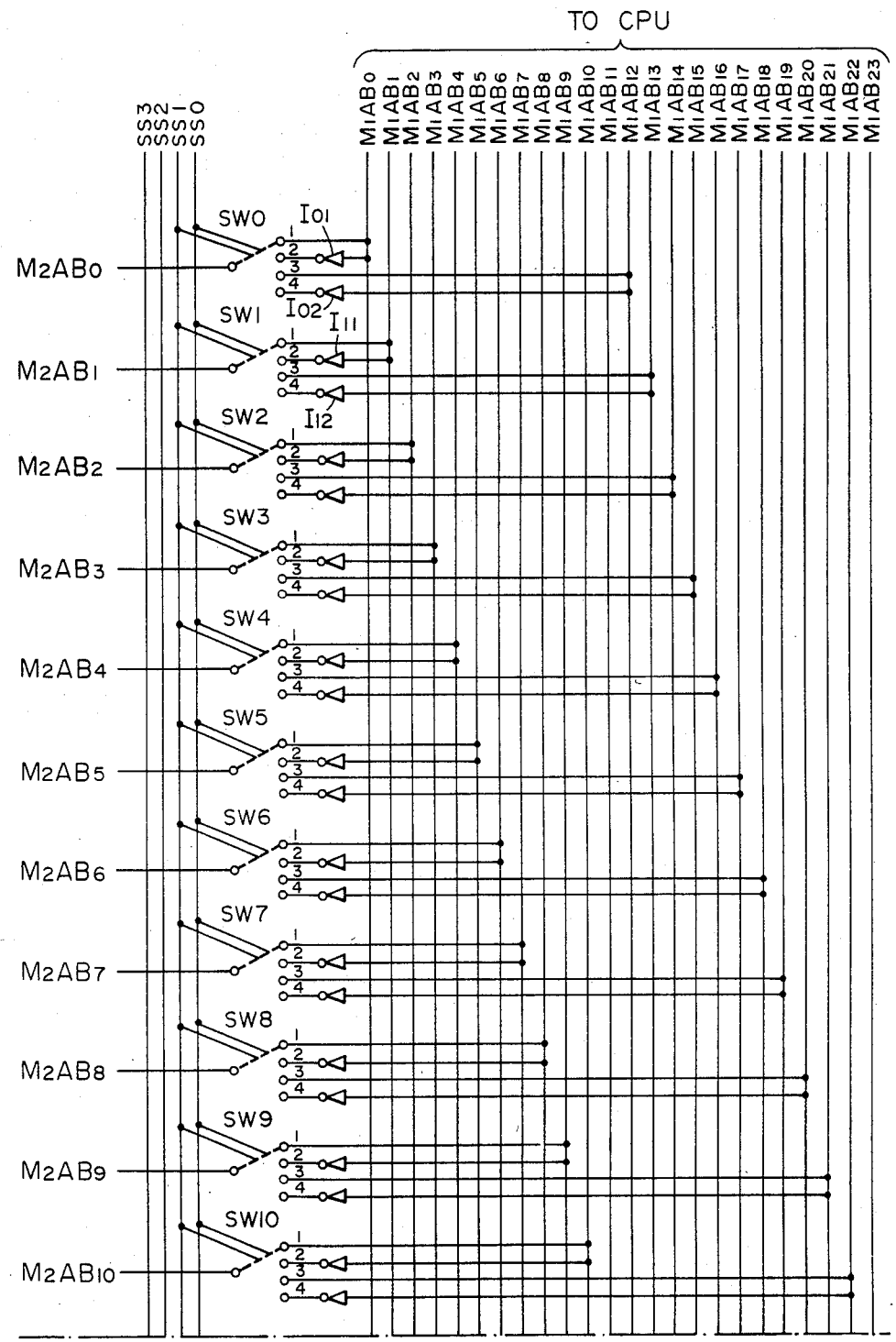
Figures 1B, 3:
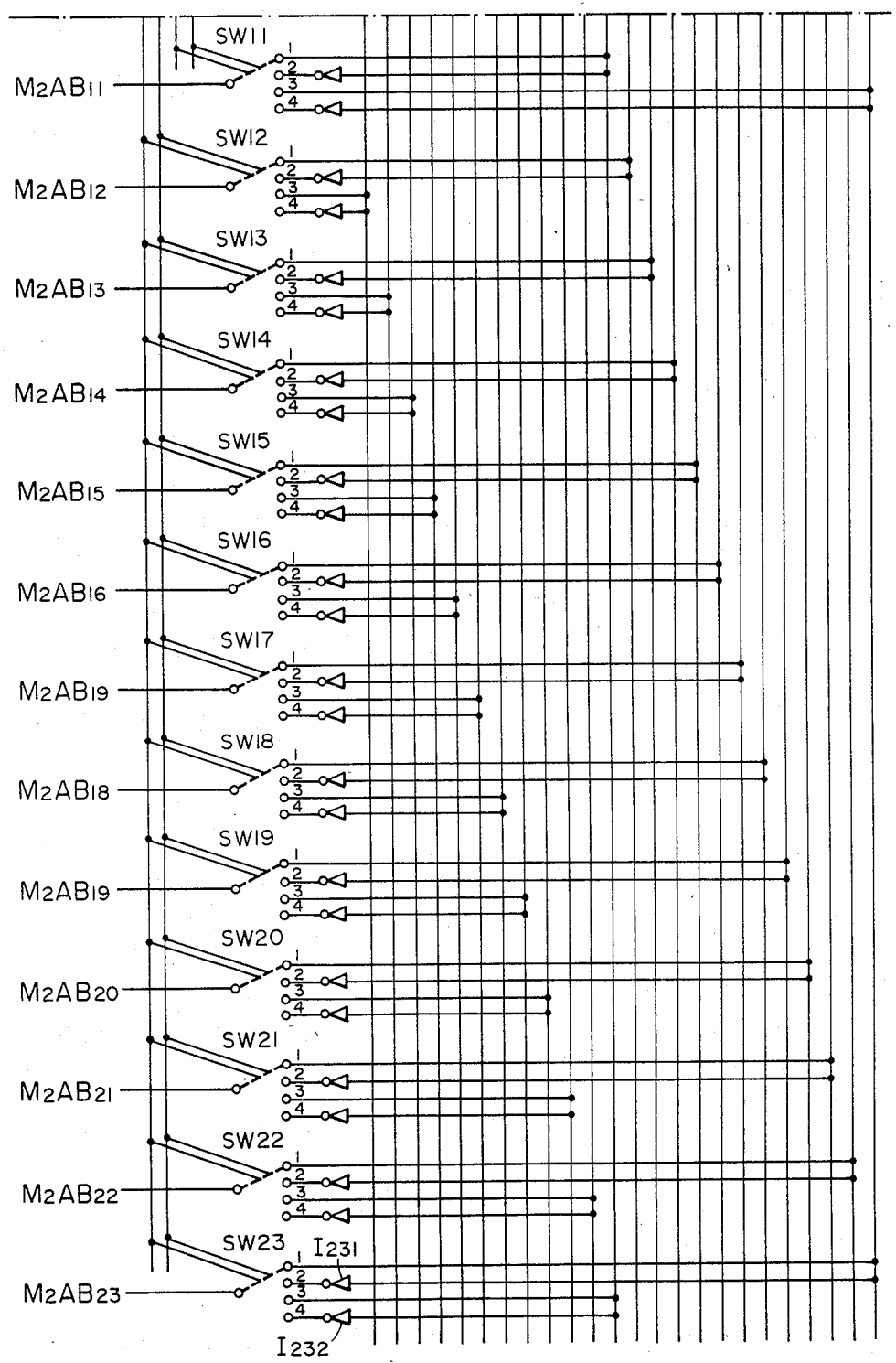

Also there are shown a data selector 108 for example composed of the element 8N74 or 157N supplied by Texas Instruments, Inc. for selecting either the mode signals from the keys 61 or the mode signal 61' from the CPU; and a mode select switch 67 which presets the selection of said signals and which, in the ON-state caused by the low-level state of the port S, releases the latch signals from the keys 61 from the ports 1Y–4Y as the signals SS0–SS3 which are utilized as the image conversion signals shown in FIG. 3-1A, 3-1B.

The above-explained elements 106, 107 and 108 function to supply said signals SS0, SS1, SS2 and SS3 all in the 1-level state in response to the actuation of the select switch 67 and the key 61a. Similarly said signals respectively become 0, 1, 1 and 0 in response to the key 61b; 1, 0, 1 and 0 in response to the key 61c; 0, 0, 1 and 0 in response to the key 61d; 1, 1, 0 and 1 in response to the key 61e; 0, 1, 0 and 1 in response to the key 61f; 1, 0, 0 and 0 in response to the key 61g; and 0, 0, 0 and 0 in response to the key 61h.

Now there will be given an explanation on the image conversion circuit shown in FIG. 3-1A, 3-1B. I said circuit there are provided multiplexers SW0–SW23 to be controlled by said signals SS0–SS3 shown in FIG. 7 and for example composed of the elements SN74S153 supplied by Texas Instruments, Inc. shown in FIG. 3-2. The multiplexers SW0–SW11 and those SW12–SW23 perform corresponding functions. FIG. 3-2 shows a multiplexer for 2 lines (AB$_n$, AB$_{n+1}$) among 24 address bus lines shown in FIG. 3-1A, 3-1B, so that there are provided 12 similar units in total. Said multiplexer connects each line selectively to the output ports 1–4 in response to said control signals SS0–SS3.

In the following there will be explained the function in detail in case the addition data Cn to the adder circuit 33 is equal to zero:

CASE 1 : SS0–SS3=(0,0,0,0) (key 61h)

In this case each multiplexer, as shown in FIG. 3-2, supplies the signals at the port 1 of n-th group and the port 1 of the (n+1)th group respectively to the lines AB$_n$ and AB$_{n+1}$. Consequently the address bus lines are so connected that M2AB0=M1AB0, ..., M2AB23=M1AB23, with no conversion of addresses. Therefore no image conversion is effected, and the data readout from the memory 36 is effected to control the laser for reproducing an image without address conversion as shown by the state 201 in FIG. 4.

CASE 2 : SS0–SS3=(1,0,0,0) (key 61g)

In this state the multiplexers SW0–SW11 supply the signals at the port 2 to the lines AB$_n$ and AB$_{n+1}$, while the multiplexers SW12–SW23 supply the signals at the port 1 to the lines AB$_n$ and AB$_{n+1}$. Consequently the address bus lines in the former half are so connected that $\overline{M1AB0}$=M2AB0, ..., $\overline{M1AB11}$=B2AB11, while those in the latter half are so connected that M1AB12=M2AB12, ..., M1AB23=M2AB23, whereby the address in the lower digits is inverted. Therefore the reproduction is controlled so as to provide a laterally inverted image as shown in 202 in FIG. 4.

CASE 3 : SS0–SS3=(0,0,1,0) (key 61d)

In this state the multiplexers SW0–SW11 are connected to the ports 1 while those SW12–SW23 are connected to the ports 2, whereby M1AB0=M2AB0, ..., M1AB11=M2AB11; $\overline{M1AB12}$=M2AB12, ..., $\overline{M1AB23}$=M2AB23 to invert the address in the upper digits. Consequently the reproduced image is vertically inverted as shown by 203 in FIG. 4.

CASE 4 : SS0–SS3=(1,0,1,0) (key 61c)

The multiplexers SW0–SW23 are all connected to the ports 2, whereby $\overline{M1AB0}$=M2AB0, ..., $\overline{M1AB23}$=M2AB23 thus inverting all the addresses. Thus the reproduced image is inverted both vertically and laterally as shown by 204 in FIG. 4.

CASE 5 : SS0–SS3=(0,1,0,1) (key 61f)

In this state the multiplexers SW0–SW23 are all connected to the ports 3 so that M1AB0=M2AB12, ..., M1AB11=M2AB23, M1AB12=M2AB0, ..., M1AB23=M2AB11 whereby the address of the lower digits are interchanged with that of the upper digits. Consequently the reproduced image appears as shown in 205 in FIG. 4.

CASE 6 : SS0–SS3=(1,1,0,1) (key 61e)

The multiplexers SW0–SW11 are all connected to the ports 4 while those SW12–SW23 are all connected to the ports 3, so that $\overline{M1AB0}$=M2AB12, ..., $\overline{M1AB11}$=M2AB23, M1AB12=M2AB0, ..., M1AB23=M2AB11 whereby the addresses of the lower digits are inverted and interchanged with those of the upper digits. Consequently the reproduced image appears as shown in 206 in FIG. 4.

CASE 7 : SS0–SS3=(0,1,1,1) (key 61b)

The multiplexers SW0–SW11 are all connected to the ports 3 whereas those SW12–SW23 are all connected to the ports 4, so that M1AB0=M2AB12, . . . , M1AB11=M2AB23, M1AB12=M2AB0, . . . , M1AB23=M2AB11, whereby the addresses of the upper digits are inverted and interchanged with those of the lower digits. Consequently the reproduced image appears as shown by 207 in FIG. 4.

CASE 8 : SS0–SS3=(1,1,1,1) (key 61a)

The multiplexers SW0–SW23 are all connected to the ports 4 so that $\overline{M1AB0}$=M2AB12, . . . , $\overline{M1AB11}$=M2AB23, $\overline{M1AB12}$=M2AB0, . . . , $\overline{M1AB23}$=M2AB11, whereby the addresses of the upper and lower digits are both inverted and interchanged. Consequently the reproduced image appears as shown by 208 in FIG. 4.

The control circuit 34 is so designed as not to release the following combinations of the signals:

SS0, SS1, SS2, SS3=(0,1,0,0), (1,1,0,0), (0,1,1,0), (1,1,1,0), (0,0,0,1), (1,0,0,1), (0,0,1,1), and (1,0,1,1).

FIG. 5 shows the further correction by the addition system of the image converted by said converting circuit 32 to correct image overflow.

It is now assumed that an image of the size A4 is stored in the memory 36 by means of the aforementioned scanning, as shown by 201 in FIGS. 4 and 5. Although said memory 36 has a square memory area, the hatched area b does not store the image information. In the copying operation the hatched area b is not copied because of the aforementioned direction of the copy sheet. The area reproduced on the copy will hereinafter be referred to as reproducible area.

In case said image area a is converted for example by the signals SS0–SS3=(1,0,1,0) corresponding the actuation of the key 61c, the resulting inverted image 204 overflows from the reproducible area as shown in FIG. 5.

However, according to the present invention, addition data C0–C23 are added by the adder circuit 33 to the address bus data AB0–AB23 to cause the parallel displacement of the image as shown by 209 thereby displacing the image area to the reproducible area. In this manner it is rendered possible to avoid the lack in the image at the copying operation. Also it is possible to cause such overflow of image intentionally thereby removing the unnecessary image.

In FIG. 8 FA0–FA3 constitute a known 4-bit parallel binary adding circuit, which is repeated in 6 units to constitute the adder circuit. If the aforementioned parallel displacement of the image to the position shown in 209 corresponds to the image lifting upwards by m rows, such displacement can be achieved by subtracting m from all the row addresses. Consequently a binary signal corresponding to −m is supplied to C0–C11 and added to the address bus bits M2AB0–M2AB11, and the memory addresses are instructed by the result of the addition M3AB0–M3AB23.

Also in response to the signals SS0–SS3=(0,1,1,1) the image 201 in FIG. 5 is rotated to the position shown by 207, so that ca. 30% of the image overflows from the reproducible area and this is shifted to the left. Also in such case it is possible to shift the overflowing area to an arbitrary position by adding suitable numbers by means of the adder circuit 33. The position 210 in FIG. 5 shows a centered image obtained by a shift upwardly by 1 rows and rightwardly by p columns, in which case a signal corresponding to −1 is introduced to C0–C11 while a signal corresponding to +p is introduced to C12–C23 to cause additions to the address bus bits M2AB0–M2AB23. The above-mentioned shifts are achievable by the resulting signals M3AB0–M3AB23. It is to be noted that an arbitrary image shifting is possible by suitably selecting the data of C0–C11 and C12–C23 by means of numeral keys 62.

In a similar manner the image 202 or 203 shown in FIG. 4 can be corrected as explained in the foregoing with respect to the image 204, and the image 205, 206 or 207 can be corrected as explained with respect to the image 207, and the copying in the appropriate position of the copy sheet can thus be assured.

The copying is achieved by actuating the copy key 60 after the monitoring and confirmation of the converted image on the cathode ray tube by the actuation of the monitor key 65, whereby the data scanned from the initial address of the memory are stored in succession in the buffer memories 38-1, 38-2 to initiate the copying operation.

In addition to the foregoing addition system, it is also possible to prevent the image overflowing by means of the reduction readout operation. This can be achieved by reducing the rotating speed of the drum, modifying the laser scanning speed in synchronization with the drum speed and skipping every other column in the address data M1ABn for the CPU while maintaining the original address scanning speed. Also it is possible to obtain an image reduced to ¼ simply by skipping the every other row and every other column in the address data M1ABn while maintaining the original address scanning speed.

The above-mentioned data 1, m etc. necessary in the addition or subtraction for such image corrections are preset in the CPU in relation to the signals SS0–SS3, and, in response to the control signals SS0–SS3 supplied from the conversion control circuit 34, the CPU identifies the image conversion mode and supplies the suitable addition data corresponding to said mode to the addition control circuit 35.

Such control is also possible by directly checking the address bus outputs M2ABn from the circuit 32 and correspondingly selecting the required addition data.

When the storage key 64 is actuated for data storage from the CCD's to the image memory 36, the converting circuit 32 is connected to the address bus line in the normal mode state, and the addition data Cn of the adder circuit 33 are set to zero. This is achieved by the CPU which, upon identifying the actuation of said key 64, sets the circuits 34, 35 to the normal state.

It is furthermore possible to store a previously converting image into the memory. This is achieved by effecting the data latch in advance by the mode keys 61 to determine the addition data of the adder circuit by said latch signals SS0–SS3, and actuating the memory key 64 to effect the data write-in into the memory 36 through the address bus connection corresponding to thus selected mode. The data readout in this case is achieved through the address bus connection of the above-explained normal mode in response to the actuation of the key 65.

In order to avoid erroneous function either in the image conversion at the data entry or at the data readout, it is desirable to construct the control circuits 34, 35 in such a manner that the image conversion is only possible when the actuations are made in the order of mode keys 61 and then the memory key 64 in the former case, or in the order of key 64 and then the keys 61 in the latter case. This is achieved by a shift switch 68 shown in FIGS. 1–2, which enables the sequence of 61–64 or 64–61 respectively when it is placed at left or at right.

The control signal 61' from the CPU shown in FIG. 7 is released for controlling the address bus line at the data write-in and data read-out, and is usually a normal control signal generated in response to the actuation of the memory key 64, monitor key 65 or print key 60.

According to the present invention it is furthermore possible, after data readout with a determined mode to an intermediate address, to switch the state of the address bus line thereby converting the address after said intermediate address for example into the mirror image.

In the circuit shown in FIG. 2, the shift register 42 is capable of storing the data of messages from the CPU into the non-image area b of the memory 36. Said register 42 is so controlled at the image data storage as to release the data stored therein in synchronization with the scanning period of said area b. Such message, for example indicating the trouble in the CPU, stored in said area b, is displayed on the cathode ray tube at the monitoring operation but is erased in case of the image conversion by the mode keys 61.

It is also possible to store image data for example numerals for the purpose of numbering from the CPU and through said register 42 into an area of the memory 36 not undesirably affecting the original image, and to reproduce said data with the original image at the image conversion. Such area of the memory is determined by the CPU in response to the monitoring data received from the shift register 41.

FIGS. 9A–9D shows examples of copies in which a certain number of rows in the original or converted image is blanked out (A) or blacked out (B), or certain number of columns are similarly blanked out or blacked out (C) (D). In this manner it is rendered possible to obtain copies without the unnecessary or secret portion of the original, thereby enabling to maintain the secrecy or to make a space for memorandum.

Figure 10:
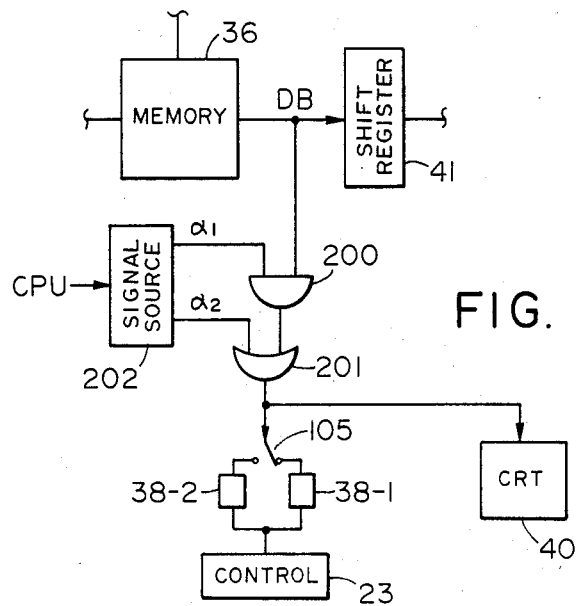
FIGS. 10 and 11 are circuit diagrams for conducting the image conversions shown in FIG. 9.

FIG. 10 shows a control circuit for obtaining the above-explained copies FIG. (9A) and FIG. (9B), wherein 200 is an AND gate provided in the data bus DB for intercepting the high-level signals in the serial image data supplied from the memory 36 to the cathode ray tube 40 and the buffer memories 38-1, 38-2; 201 is an OR gate provided in the data bus DB for releasing high-level signals regardless of the state of the image data; and 202 is a signal source for controlling said gates 200, 201. The high- and low-level image data respectively correspond to black and white pixels.

Figures 9A, 9B, 9C, 9D:
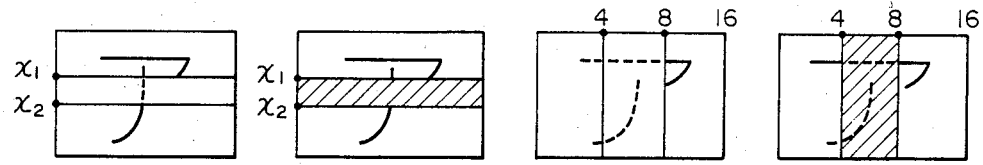
FIGS. 9a–d and 12 are explanatory views showing other image conversions.

In the normal state, the control signal source 202 releases high- and low-level signals at the output terminals $\alpha 1$ and $\alpha 2$ respectively, whereby the gates 200, 201 transmit the image data on the data bus DB to provide the normal reproduction of said original or converted image. However in case the terminals $\alpha 1$, $\alpha 2$ are both given low-level signals during a determined period in the readout scanning of the memory 36, the gate 200 inhibits the data transmission during said period to provide a partially blanked copy as shown in FIG. 9A. Said period is determined in synchronization with the serial address data M1ABn supplied from the CPU, in such a manner that such image data inhibition is initiated at a determined point x1 and terminated at another determined point x2. In order to determine said positions x1, x2, the numerals (000–) FFF) indicating the corresponding rows x1', x2' are preset in the CPU or in the signal source 202 by means of exclusive keys of 0–F, numerals 42 or mode keys 61 (a–f). A number y1 instructed by the first three actuations of said keys and another number y2 instructed by the succeeding three actuations of said keys are set respectively corresponding to said row positions x1' and x2'. The CPU changes the signal $\alpha 1$ of the signal source to low-level when x1' coincides with y1 and shifts said signal again to high-level when x2' coincides with y2, thereby achieving blank-out between the addresses x1 and x2. Such partial image erasing is facilitated during the monitoring on the cathode ray tube if the screen thereof is marked, on the left-hand end thereof, with marks 0–A corresponding to the first digit 0–A of the row address data. In order to effect the above-mentioned and other operations on the converted image, it is preferable to store the already converted image into the memory 36.

In case the signal $\alpha 2$ of the signal source 202 is maintained at the high level during a period from the address x1 to x2, the gate 201 releases a high-level signal as the image data during said period to provide a partial blacked-out area as shown in FIG. 9B.

The control panel 102 is provided with a white key WT and a black key BL for selecting said blank-out or black-out modes. Said outputs $\alpha 1$, $\alpha 2$ are retained until the completion of plural copies to be obtained from the same original.

Also the aforementioned latch circuit 100 shown in FIG. 7 maintains the latch state until it is reset at the completion of the final beam scanning.

Figure 11:
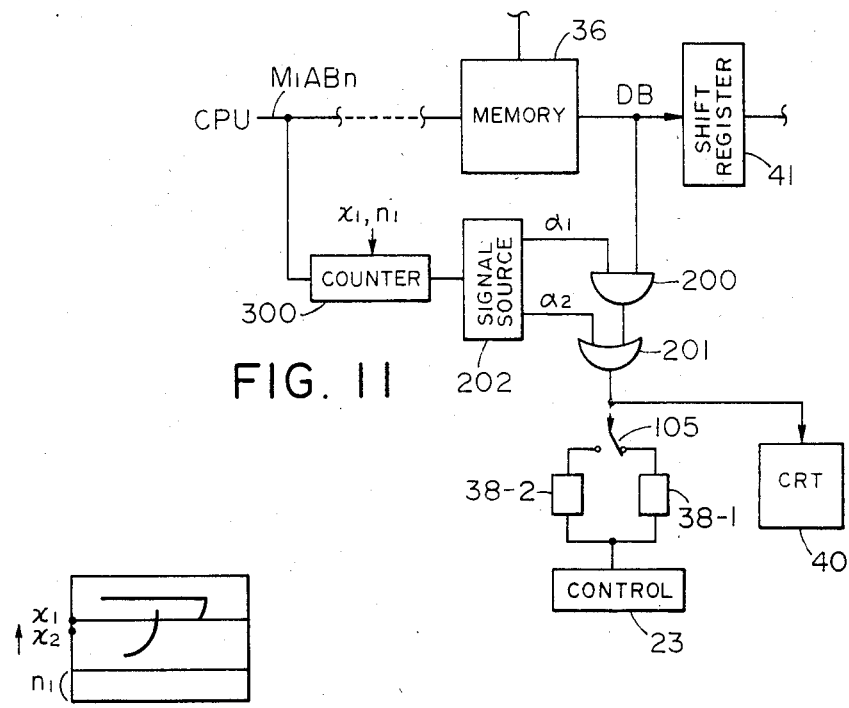

FIG. 11 shows a control circuit for obtaining the partially deleted copies as shown in FIGS. 9C and 9D, wherein 300 is a counter for counting the uppermost bit of the second digit of the column address in the aforementioned 24-bit address data supplied from the CPU, said counter 300 being adapted to be preset by the aforementioned keys 0–F. Thus said counter counts 16 and is reset during each row scanning. In case said counter is for example preset at 4 and 8 in succession by the above-mentioned keys, the counter releases a pulse upon 4-count to shift the signal $\alpha 1$ from high-level to low-level while maintaining the signal $\alpha 2$ in the low-level state, and again releases a pulse upon further 8 count to return the signal $\alpha 1$ to the high-level state in each row, thereby providing a blanked-out area in the central portion of the image. Such blanking-out is selected by said white key WT. When said counting function is not selected the signal source 202 maintains the signals $\alpha 1$ and $\alpha 2$ respectively at the high-level and low-level thereby causing the original image data to be copied without change. Also said black key BL shifts the signal $\alpha 2$ to the high-level state during said period thereby providing a partially blacked-out image.

Figure 12:
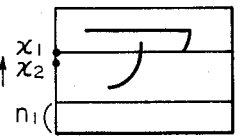

FIG. 12 shows a copy in which a part of rows is deleted and the lower part is accordingly lifted. The obtained copy is more easily legible as the blank area is not reproduced.

Such copying is made possible by operating the adder circuit 33 (FIG. 2) when the memory address data from the CPU reach a row x1 and providing n1 as the addition data C0–C23 (FIG. 8) to the ensuing address data, thereby causing the address to jump from the row x1 to another row x2 distant by n1. These addresses x1, x2 can be preset in the CPU as explained in relation to FIG. 10. The CPU processes such data x1, x2 to obtain the data C0–C23 and controls the adder circuit 33 in the above-mentioned manner.

In case a part of the image stored in the memory 36 is skipped as explained above, there may be repeated the address scanning from the initial address after completion of the address scanning, particularly when repetitive copying is instructed. For this reason the initial part of the memory may be reproduced on the remaining portion of the copy sheet. In order to prevent such error the high-level overflow output OVF shown in FIG. 8 is supplied as the signal $\alpha 1$ to the AND gate 200 shown in FIG. 10. In this manner said overflow output is released when the output M3AB24 becomes high-level upon completion of the memory scanning whereby the gate 200 maintains the image data at the low-level thereafter. At the same time the addition data C0–C23 are cancelled and automatically set again, in case of repetitive copying, at the address x1. Also said overflow output is reset at the completion of each copying.

In relation to the circuit of FIG. 10, it is also possible to print a broken line at the center of the blanked-out portion by detecting the center point of the addresses x1 and x2 by means of the CPU and releasing high-level serial pulses as the signal $\alpha 2$ for a short period at said point.

As explained in the foregoing, the present invention, in which the original image of the document is once stored in a memory and again read therefrom in an off-time operation for image printing with eventual image conversion by pixel control at said image storage or said image readout, allows reproduction of the image in the direction, position or orientation different from the original image, thus enabling image reproduction in an appropriate position on copy sheets arranged in a determined position and direction for example in a cassette. It is also rendered possible to cancel unnecessary portions of the original image or to add other information thereto.

What I claim is:

1. A copying apparatus, comprising:
   a member on which an original document having an image to be copied may be placed;
   scanning means for scanning the image of an original document placed on said member;
   memory means for storing said original image scanned by said scanning means in a state of a group of pixels;
   copy mode input means for determining the type of image conversion to be used for forming a copy image on a copy material in a relationship faithful to or different from the image of the original document placed on said member;
   first control means having a readout function for controlling the pixel data readout from said memory means in response to the input signal from said mode input means for effecting image conversion;
   second control means for controlling the readout function of said first control means, in response to the input means for producing said image in a determined position on the copy material; and
   image forming means for forming the image at the determined position on the copy material in response to the readout data thus controlled by said second control means.

2. A copying apparatus according to the claim 1, wherein said memory means comprises an address bus and wherein first and second control means are adapted to control the address bus of said memory means.

3. A copying apparatus, comprising:
   a member on which an original document having an image to be copied may be placed;
   scanning means for scanning the image of an original document placed on said member;
   memory means for storing said original image scanned by said scanning means in a state of a group of pixels;
   copy mode input means for determining the type of image conversion to be used for forming a copy image on a copy material in a relationship faithful to or different from the image of the original document placed on said member;
   first control means having a readout function for controlling the pixel data readout from said memory means in response to the input signal from said mode input means for effecting image conversion;
   second control means for controlling the readout function of said first control means, in response to the input means, for producing said image in a determined position on the copy material; and
   image forming means for forming the image at the determined position on the copy material in response to the readout data thus controlled by said second control means, wherein address data is used to access said memory means and wherein said second control means is adapted to effect addition control of the address data used to access said memory means controlled by said first control means.

4. A copying apparatus, comprising:
   a member on which an original document having an image to be copied may be placed;
   scanning means for scanning the image of an original document placed on said member;
   memory means for storing said original image scanned by said scanning means;
   control means for controlling data write-in or readout to or from said memory means for forming an image on a copy material in a relationship faithful to or converted to an image different from the image of the original document placed on said member;
   display means for displaying at least the converted image data from said memory means for monitoring the image converted by said control means; and
   process means for forming the image converted by said control means on the copy material.

5. A copying apparatus according to the claim 4, wherein said display means is adapted to display both image data and non-image data read out from said memory means.

6. A copying apparatus according to the claim 4, wherein said display means is adapted to display a message not copied on the copy material.

7. A copying apparatus according to the claim 4, wherein said control means is adapted to control the data readout from said memory means for cancelling a part of the original image.

8. A copying apparatus, comprising:
   a member on which an original document having an image to the copied may be placed;
   scanning means for scanning the image of an original document placed on said member;
   memory means for storing said original image scanned by said scanning means;
   manual preset means for controlling data write-in or read-out to or from said memory means for forming an image on a copy material in a relationship faithful to or converted to an image different from the image of the original document planed on said member;

automatic preset means for controlling data write-in or read-out to or from said memory means for forming, without control by said manual present means, an image on the copy material in a faithful relationship to or in a converted predetermined different mode from said original image, wherein data for determining the image producing mode is outputted automatically upon depression of a key; and process means for forming the image converted by said manual preset means or said automatic preset means on the copy material.

9. A copying apparatus according to the claim 8, wherein said manual preset means is adapted to control address scanning of said memory means for forming the image in a desired direction, position or orientation with respect to said original image.

10. A copying apparatus, comprising:

a member on which an original document having an image to be copied may be placed;

scanning means for scanning the image of an original document placed on said member;

memory means having image data addresses for storing as image data the original image scanned by said scanning means;

means for generating an image conversion instruction signal for forming an image on a copy material while cancelling a part of the original image scanned from said member or the image stored in said memory means;

address means for scanning image data addresses of said memory means for storage or readout of the image data into or from said memory means;

control means for controlling the image data readout from said memory means in synchronization with said address means and in response to the conversion signal from said signal generating means for partial image cancellation according to the image conversion instruction signal, wherein said cancellation is under control of an image data stream; and process means for forming the copy image on the copy material in response to the image data from said memory means and controlled by said control means.

11. A copying apparatus according to the claim 10, wherein said control means is adapted to control the readout signal so as to form a white or black portion in said cancelled portion of the reproduced image.

12. A copying apparatus according to the claim 11, wherein said control means is adapted to control said address means so as to form the reproduced image without leaving a space in said cancelled portion.

13. An image forming apparatus comprising:

memory means for storing an image to be formed in a state of a group of pixels;

control means for controlling data or data read out from said memory means for forming an image on a material in a relationship faithful to or converted to an image different from the stored image;

display means for displaying at least the converted image data from said memory means for monitoring the image converted by said control means and for displaying a condition of the apparatus; and process means for forming the image converted by said control means on the material.

14. An image forming apparatus comprising:

memory means for storing an image to be formed in a state of a group of pixels at a plurality of pixel addresses;

means for generating an image conversion instruction signal for forming an image on a material while cancelling a part of the image stored in said memory means;

address means for scanning the pixel addresses of said memory means for storage or readout of the image into or from said memory means;

control means for controlling the data from said memory means in response to the conversion instruction signal from said signal generating means for partial image cancellation according to the image conversion instruction signal, wherein said cancellation is under control of an image data stream;

means for displaying at least the converted image so that the converted image may be monitored; and process means for forming the image a preset number of times on the material in response to the image data from said memory means and controlled by said control means.

15. A copying apparatus, comprising:

scanning means for scanning an original image;

copy mode input means for determining the type of image reproduction, without manually inputting the position data, to be used for forming a copy image at a predetermined position on a copy material;

control means having a read out function for controlling the output operation of the image data to an image forming station in response to the input signal from said mode input means; and image forming means for forming the image on the predetermined position of the copy material in response to the readout data thus controlled by said control means.

16. A copying apparatus, comprising:

scanning means for scanning an image means for generating an image data according to said original image scanned by said scanning means;

control means for controlling said image data generating means for forming either an identical image on a copy material or an image different from the image of the original image;

display means for displaying information related to the image conversion by said control means; and process means for forming the image converted by said coated means on the predetermined position of the copy material.

17. A copying apparatus, comprising:

scanning means for scanning an original document having an image to be copied;

memory means for storing said original image scanned by said scanning means;

manual preset means for controlling data write-in or read-out to or from said memory means for forming an image on a copy material in a relationship faithful to or converted to an image different from the image of the original document;

automatic preset means for controlling data write-in or read-out to or from said memory means for forming, without control by said manual preset means, an image on the copy material in a faithful relationship to or in a converted predetermined different mode from the original image, wherein data for determining the image producing mode is outputted automatically upon depression of a key; and process means for forming the image converted by said manual preset means or said automatic preset means copy material.

18. A copying apparatus, comprising:

scanning means for scanning an original document having an image to be copied;

memory means having image data addresses for storing as image data the original image scanned by said scanning means;

means for generating an image conversion instruction signal for forming an image on a copy material while cancelling a part of the original image scanned or the image stored in said memory means;

address means for storage or readout of the image data into or from said memory means;

control means for controlling the image data from said memory means in response to the conversion signal from said signal generating means for partial image cancellation according to the image conversion instruction; and process means for forming the copy image on the copy material in response to the image data from said memory means and controlled by said control means.

19. A copying apparatus, comprising:

scanning means for scanning the original image;

means for generating image data according to said original image scanned by said scanning means;

copy mode input means for determining the type of image conversion to be used for forming a copy image on a copy material in a relationship faithful to or different from the image of the original document placed on said member;

first control means for controlling the data write-in or readout from said image data means in response to the input signal from said mode input means for effecting image conversion;

second control means for controlling the function of said first control means, in response to the input signal from said mode instructions for producing said image in a predetermined position on the copy material; and image forming means for forming the image at the predetermined position on the copy material in response to the readout data thus controlled by said second control means.

20. An image forming apparatus comprising:

memory means for storing image data to be formed on a material;

means for reading out the image data from the memory means;

manual preset means for controlling an output operation of the image data to an image forming station for forming an image on a material either the same as or different from the stored image;

automatic preset means for controlling an output operation of the image data to an image forming station for forming, without control by said manual preset means, an image on the material in a faithful relationship to or converted in a predetermined different relationship from the stored image, wherein data for determining the image producing mode is outputted automatically upon depression of a key; and process means for forming the image converted by said manual preset means or said automatic preset means on the material.

21. An apparatus according to claim 1, 9, 10, 19 or 20, further comprising means for displaying information related to the image conversion.

22. An apparatus according to claim 4 or 14 wherein said display means display the converted image and a message different from said converted image.

23. An apparatus, according to claim 22, wherein said message is not formed on the material.

24. An apparatus according to claim 4 or 14 wherein said display means includes a key for causing a display without image formation.

25. An apparatus according to claim 4, 8, 10, 17, 18 or 20 further comprising numerical key means for presetting the number of time image formation is repeated.

26. An apparatus according to claim 14, wherein the conversion signal is generated by means for presetting the number.

27. An apparatus according to claim 14 wherein said conversion signal is latched until the termination of the said number of image formations.

28. An apparatus according to claim 10, 14 or 18 wherein said control means includes means for inhibiting the transmission of the data from the memory means at predetermined times.

29. An image forming apparatus comprising:

means for generating image data according to an original image, manually operable first instruction means for generating a signal for presetting an image producing mode, and automatically operable second instruction means for generating a signal for presetting a predetermined image producing mode, wherein data for determining the image producing mode is outputted automatically upon depression of a key, control means for controlling said image data generating means in response to said first or second instruction means for converting the original image or determining an image position, and process means for printing the image on a material in accordance with the data from said data generating means controlled by said control means.

30. An image processing apparatus comprising:

scanning means for scanning an original image, means for generating image data according to the original image scanned by said scanning means, first input means for generating a first instruction signal for converting an original image or positioning an image to produced, second input means for generating a first instruction signal for cancelling a part of the original image scanned by said scanning means, under control of an image data stream, and control means for controlling said image data generating means in response to said first input means for converting or positioning the image and controlling said image data from said image data generating means in response to said second input means for cancelling said part of the original image.

31. An image processing apparatus comprising: means for generating image data, first input means for generating a first signal for instructing cancellation of a part of the image, second input means for generating a second signal for instructing the production of alternative image data instead of the cancelled image data, and control means for controlling the image data from said image data generating means in response to said first and second input means for cancelling the required part of said image and for producing the alternative image data in correspondence with the required part, said cancellation occurring under the control of an image data stream.

32. An image forming appartus, comprising:

page memory means for storing an image to the formed;

converting mode input means for generating an input signal determining the type of image conversion to be used for forming an image on a material in a first or second determined direction, and as a determined normal or mirror image with respect to the stored image;

control means having a read out function for controlling the pixel data read out from said memory means in response to the input signal from said mode input means for effecting image conversion;

means for displaying at least the converted image so that the converted image may be monitored; and image forming means for forming the image a preset number of times at the determined position on the material in response to the data controlled by said control means, wherein said display means display the converted image and a message different from said converted image.

33. An image forming apparatus:

memory means for storing an image to be formed in a state of a group of pixels;

control means for controlling data or data read out from said memory means for forming an image on a material in a relationship faithful to or converted to an image different from the stored image;

display means for displaying at least the converted image data from said memory means for monitoring the image converted by said control means and for displaying a condition of the apparatus; and process means for forming the image converted by said control means on the material, wherein said display means display the converted image and a message different from said converted image.

34. A copying apparatus, comprising:

scanning means for scanning an image;

means for generating an image data according to said original image scanned by said scanning means;

control means for controlling said image data generating means for forming either an identical image on a copy material or an image different from the image of the original image;

display means for displaying information related to the image conversion by said control means; and process means for forming the image converted by said control means on the predetermined position of the copy material, wherein said display means display the converted image and a message different from said converted image.

35. An image forming appartus, comprising:

page memory means for storing an image to the formed;

converting mode input means for generating an input signal determining the type of image conversion to be used for forming an image on a material in a first or second determined direction, and as a determined normal or mirror image with respect to the stored image;

control means having a read out function for controlling the pixel data read out from said memory means in response to the input signal from said mode input means for effecting image conversion;

means for displaying at least the converted image so that the converted image may be monitored; and image forming means for forming the image a preset number of times at the determined position on the material in response to the data controlled by said control means, wherein said display means includes a key for causing a display without image formation.

36. An image forming appartus:

memory means for storing an image to be formed in a state of a group of pixels;

control means for controlling data or data read out from said memory means for forming an image on a material in a relationship faithful to or converted to an image different from the stored image;

display means for displaying at least the converted image data from said memory means for monitoring the image converted by said control means and for displaying a condition of the apparatus; and process means for forming the image converted by said control means on the material, wherein said display means includes a key for causing a display without image formation.

37. An image forming appartus, comprising:

page memory means for storing an image;

scanning means for scanning the addresses of said memory means for data read-out from said memory means;

control means for controlling an output operation of the data stored at the addresses from said memory means to a process station in response to a conversion instruction signal to thereby change the position of image reproduction on a sheet;

means for displaying at least the converted image so that the converted image may be monitored; and process means for image reproduction a preset number of times at a desired position on the sheet according to the data controlled by said control means, wherein said display means includes a key for causing a display without image formation.

38. A copying apparatus, comprising:

scanning means for scanning an image;

means for generating an image data according to said original image scanned by said scanning means;

control means for controlling said image data generating means for forming either an identical image on a copy material or an image different from the image of the original image;

display means for displaying information related to the image conversion by said control means; and process means for forming the image converted by said control means on the predetermined position of the copy material, wherein said display means includes a key for causing a display without image formation.

39. A copying apparatus, comprising:

a member on which an original document having an image to be copied may be placed;

scanning means for scanning the image of an original document placed on said member;

memory means for storing said original image scanned by said scanning means in a state of a group of pixels;

copy mode input means for determining the type of image conversion to be used for forming a copy image on a copy material in a relationship faithful to or different from the image or the original document placed on said member;

first control means having a readout function for controlling the pixel data readout from said memory means in response to the input signal from said mode input means for effecting image conversion;

second control means for controlling the readout function of said first control means, in response to the input means for producing said image in a determined position on the copy material;

means for setting a predetermined number of prints to be made of said image; and image forming means for forming said set predetermined number of prints in accordance with the image at the determined position on the copy material in response to the readout data thus controlled by said second control means.

40. A copying apparatus, comprising:

a member on which an original document having an image to be copied may be placed;

scanning means for scanning the image of an original document placed on said member;

memory means for storing said original image scanned by said scanning means in a state of a group of pixels;

converting mode input means for determining the type of image conversion to be used for forming a copy image on a copy material in a first or second determined direction, and as a determined normal or mirror image with respect to the image of the original document placed on said member;

scanning control means for controlling the scanning direction of the pixels of said memory means in response to the input signal from said mode input means for effecting image conversion;

means for setting a predetermined number of prints to be made of said image; and image forming means for forming said set predetermined number of prints in accordance with the image on the copy material in the first or second determined direction and as the determined normal or mirror image in response to the pixel data scan-controlled by said scanning control means.

41. A copying apparatus, comprising:

scanning means for scanning an original image;

copy mode input means for determining the type of image reproduction, without manually inputting the position data, to be used for forming a copy image at a predetermined position on a copy material;

control means having a read out function for controlling the output operation of the image data to an image forming station in response to the input signal from said mode input means;

means for setting a predetermined number of prints to be made of said image; and image forming means for forming said set predetermined number of prints in accordance with the image on the predetermined position of the copy material in response to the readout data thus controlled by said control means.

42. A copying apparatus, comprising:

scanning means for scanning an original image, said scanning means including a charge coupled device for main scanning and a movable member for sub-scanning;

means for generating an image data according to an image scanned by said scanning means;

converting mode input means for generating an input signal determining the type of image conversion, without changing the scanning direction of said scanning means, for forming a copy image on a copy material in a first or second predetermined direction, and as a determined normal or mirror image with respect to the original image;

scanning control means for controlling the scanning direction of said image data generating means in response to an input signal from said mode input means for effecting image conversion;

means for setting a predetermined number of prints to be made of said image; and image forming means for forming said set predetermined number of prints in accordance with the image on the copy material in the first or second predetermined position an as the determined normal or mirror image in response to the data scan-controlled by said scanning control means.

43. A copying apparatus, comprising:

scanning means for scanning an image;

means for generating an image data according to said original image scanned by said scanning means;

control means for controlling said image data generating means for forming either an identical image on a copy material or an image different from the image of the original image;

display means for displaying information related to the image conversion by said control means;

means for setting a predetermined number of prints to be made of said image; and process means for forming said set predetermined number of prints in accordance with the image converted by said control means on the predetermined position of the copy material.

44. A copying apparatus, comprising:

scanning means for scanning the original image;

means for generating image data according to said original image scanned by said scanning means;

copy made input means for determining the type of image conversion to be used for forming a copy image on a copy material in a relationship faithful to or different from the image of the original document placed on said member;

first control means for controlling the data write-in or readout from said image data means in response to the input signal from said mode input means for effecting image conversion;

second control means for controlling the function of said first control means, in response to the input signal from said mode instructions for producing said image in a predetermined position on the copy material;

means for setting a predetermined number of prints to be made of said image; and image forming means for forming said set predetermined number of prints in accordance with the image at the predetermined position on the copy material in response to the readout data thus controlled by said second control means.

* * * * *

UNITED STATES PATENT AND TRADEMARK OFFICE
CERTIFICATE OF CORRECTION

PATENT NO. : 4,562,485

DATED : December 31, 1985

INVENTOR(S) : KATSUYOSHI MAESHIMA

It is certified that error appears in the above-identified patent and that said Letters Patent is hereby corrected as shown below:

```
COLUMN 1,  line 19, after "at the" insert --time of--.
           line 53, "positioned" should read --position--.

COLUMN 3,  line 23, "FIGS." should read --FIG.--.
           line 59, after "of" insert --the--.

COLUMN 4,  line 19, "copy 60," should read --copy key 60,--.
           line 35, "of reading" should read --or reading--.

COLUMN 7,  line 40, "100" should read --106--.

COLUMN 8,  line 1, "on" should read --of--.
           line 2, "I said" should read --In that--.
           line 34, "B2AB11" should read --MZAB11--.

COLUMN 10, lines 54 and 55, "converting" should read
                  --converted--.

COLUMN 11, line 5, "FIGS." should read --FIG.--.

COLUMN 12, line 2, "(000-)" should read --(000- --.
           line 31, "100" should read --106--.

COLUMN 15, line 3, "planed" should read --placed--.
           line 7, "manual present" to read --manual preset--.

COLUMN 16, line 53, "coated means" should read --control
                  means--.

COLUMN 17, line 8, after "means" insert --on the--.
```

UNITED STATES PATENT AND TRADEMARK OFFICE
CERTIFICATE OF CORRECTION

PATENT NO. : 4,562,485

DATED : December 31, 1985

INVENTOR(S) : KATSUYOSHI MAESHIMA

It is certified that error appears in the above-identified patent and that said Letters Patent is hereby corrected as shown below:

```
COLUMN 18, line 6, after "10," insert --18,--.
           line 19, "time" should read --times--.
           line 53, after "to" insert --be--.

COLUMN 19, lines 11 and 62, "appartus" should read
           --apparatus--.
           lines 12 and 63, "the" should read --be--.
           line 32, after "apparatus" insert --, comprising--.

COLUMN 20, lines 15 and 31, "appartus" should read
           --apparatus--.

COLUMN 21, line 7, "or the" should read --of the--.

COLUMN 22, line 24, "an" should read --and--.
           line 47, "made" should read --mode--.
```

Signed and Sealed this

First Day of July 1986

[SEAL]

Attest:

DONALD J. QUIGG

Attesting Officer

Commissioner of Patents and Trademarks